March 4, 1952 M. S. COLE 2,588,086
SPEAKER AND HEATER UNIT FOR DRIVE-IN THEATERS
Filed March 12, 1949
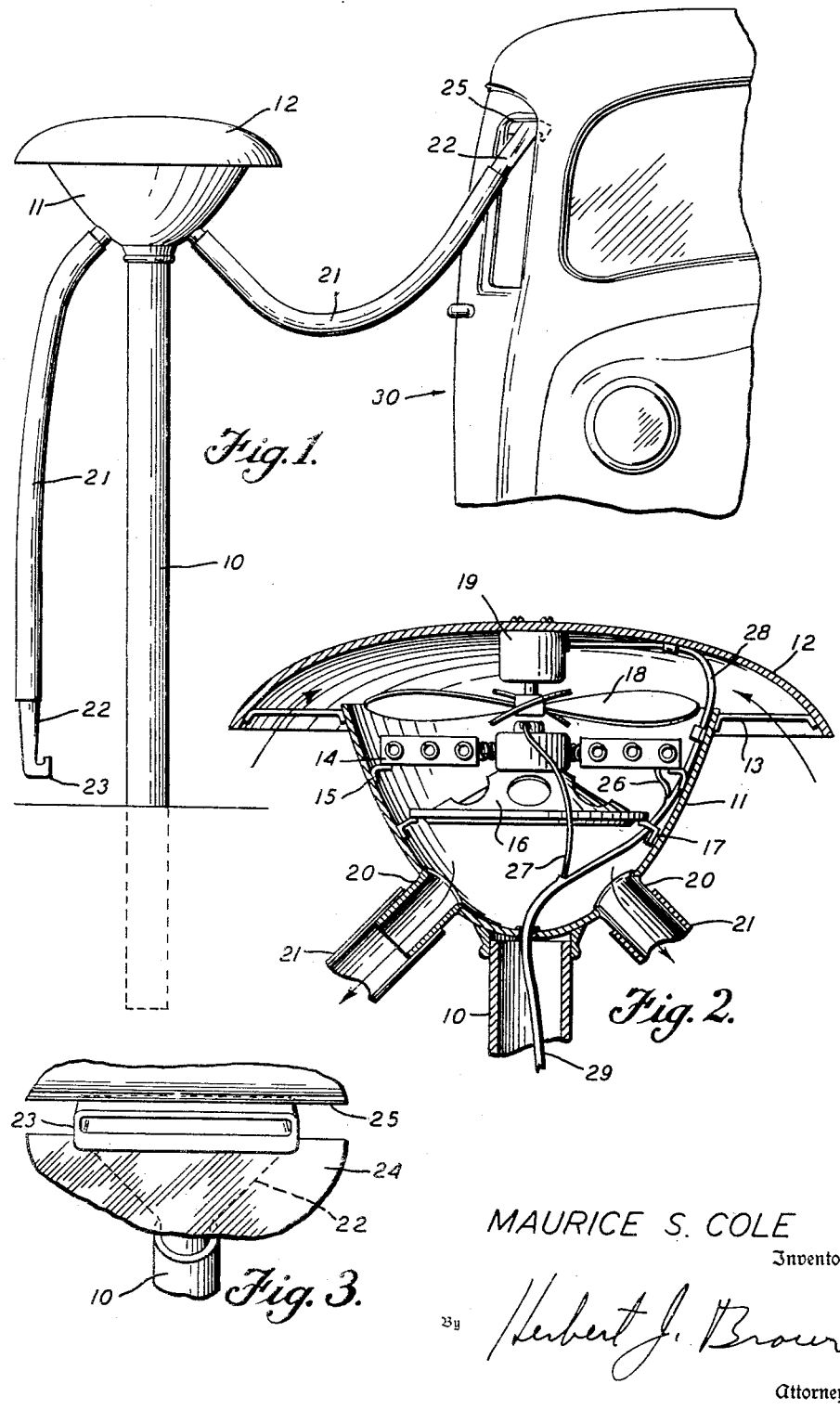
MAURICE S. COLE
Inventor
By Herbert J. Brown
Attorney Patented Mar. 4, 1952

2,588,086

UNITED STATES PATENT OFFICE 2,588,086

SPEAKER AND HEATER UNIT FOR DRIVE-IN THEATERS

Maurice S. Cole, Corsicana, Tex.

Application March 12, 1949, Serial No. 81,108

3 Claims. (Cl. 98—2)

This invention relates to "drive-in" theatres, and has particular reference to a heater and speaker unit for conveying both heat and sound to the patrons' automobiles.

A "drive-in" theatre, as herein referred to, is one having a large screen upon which moving pictures are projected and in front of which the patrons park their automobiles to view the program. Originally, large speakers were mounted near such screens, but the arrangement was objectional because it was limited to use during warm or mild weather, and because the sound could not be synchronized with the picture in large theatres for all patrons. Later, individual speakers were provided for each automobile, but these speakers were small and inexpensive because of possible theft. Some of these speakers were received within the automobiles in such a manner that the automobile windows could be nearly closed for use during cold weather. In order to keep warm, it was necessary for the patrons to operate their automobile heaters with the possibility of becoming asphyxiated since the automobiles were not moving and could not carry off the poisonous gas from the automobile exhaust or from the heater. It has been proposed that individual electric heaters be furnished by the theatres for use inside of the automobiles, but this appears to be objectionable because of possible theft, and because of the inherent danger of burning the occupants.

An object of the invention is to provide a heater and speaker unit for "drive-in" theatres, and which unit may be positioned outwardly of the patrons' automobile, and by which arrangement both sound and heat may be supplied to the occupants with the automobile windows nearly completely closed for use during cold weather.

Another object of the invention is to provide a relatively large speaker for "drive-in" theatres, yet one which cannot be readily stolen or removed.

Another object of the invention is to provide, in combination with a speaker, a heater construction having its heating elements outwardly of the patron's car so as to avoid any possibility of burning the occupants.

These and other objects of the invention will become apparent from the following description and the accompanying drawings, wherein:

Figure 1 is an elevation of an exemplary form of the invention and showing the same connected with and positioned through the partly closed side window of an automobile.

Figure 2 is an enlarged vertical sectional view of the upper portion of the unit illustrated in Figure 1, and Figure 3 is a perspective view of the discharge member of one of the supply tubes illustrated in Figure 1, and showing the same positioned between the upper edge of a raised automobile window glass and beneath the paper edge of the automobile window opening.

The embodiment of the invention illustrated in Figure 1 includes a vertical tubular standard 10 embedded at its lower end in the ground. A bell shaped housing 11 is secured to the upper end of the standard 10 with its open end directed upwardly. A concave cover 12 is positioned above and overhangs the upper end of the housing 11, and is supported in spaced relation therewith by means of brackets 13 secured to the edge of the housing 11 and to the inner surface of the cover 12. The last described arrangement provides a fresh air inlet, as indicated by arrows in Figure 2, between the housing 11 and the cover 12. An electric heater 14 is provided within the upper end of the housing 11 where it is transversely supported by brackets 15 secured to the inner housing surface. It is to be understood that the type of heater 14 employed provides for the passage of air therearound and therethrough. As shown in Figure 2, a downwardly directed speaker 16 is supported on brackets 17 secured to the inner surface of the housing 11, and the upper end of the speaker may be received between the individual elements of the heater 14.

An electric fan 18 is supported within the upper end of the housing 11, and as shown in Figure 2, and the fan 18 may be secured by attaching the fan motor 19 to the upper inner surface of the cover 12.

Communicating couplings 20 are provided in the sides and near the bottom of the housing 11, and to which flexible supply tubes 21 are attached. Substantially triangular and relatively flat discharge members 22 are connected with the outer ends of the supply tubes 21, and each said discharge member is angularly formed, as at 23, at its outer open end so as to conveniently be received between the partly closed upper edge of an automobile window glass 24 and the upper edge of the window opening 25. By reason of its described shape, the discharge member 22 additionally serves as a sound amplifying horn. An integral lip 26 is provided along the lower outer end of the discharge member 22 for hanging and supporting the latter when the glass 24 is in a position lower than shown in Figure 3.

The heating unit 14, the speaker 16, and the fan motor 19 are respectively connected by wires 26, 27, and 28 with their separate circuits which are operated independently of each other. The wires 26, 27, and 28 may be brought together near the bottom of the housing 11 and covered with insulating material 29.

The described unit is for operation between and for serving two automobiles in side by side position, with one supply tube 21 extending to each. The fan motor 19 is turned in a direction to cause fresh air to be forced downwardly, through and over the heater 14, around the speaker 16, and outwardly through each coupling 20. Thus, both sound from the speaker 16 and heat from the heater 14 may be conveyed to the interior of the automobile 30. It will be noted that the sound from the speaker 16 is carried by the air currents generated by the fan 18, and whereby the sound delivered at the discharge members does not lose much of its quality and volume as it passes through the supply tubes 21. However, it is to be understood, that while the fan 18 is to be preferred, the unit may be operated with a lesser degree of success, as in mild or warm weather, without either the fan or the heater, and in which case the sound is conveyed through the supply tube 21 without the benefit of the forced air currents. It should also be noted, as shown in Figure 1, that the supply lines, when not in use, hang from the housing 11, and are of such lengths that they do not touch the ground.

The described form of the invention may be made in many ways within the scope of the appended claims.

What is claimed is:

1. A speaker unit for a drive-in theatre comprising a vertical standard, a bell shaped housing mounted on said standard and having its open end directed upwardly, a downwardly directed fan mounted in said housing open end, an overhanging cover supported by said housing in spaced relation above said open end of said housing so as to form a fresh air inlet opening, at least one outlet opening in the lower portion of said housing, a speaker mounted in a horizontal plane within said housing and spaced from the sloping walls of the latter so as to form an annular air passage for the air delivered by said fan, and a flexible tube connected at one end thereof with said outlet opening and having the remaining end thereof adapted to be received within a window of an automobile parked beside said standard.

2. A speaker unit as defined in claim 1, and including an electrical heating unit within said housing and positioned within the path of the air delivered by said fan to said air outlet.

3. A speaker unit as defined in claim 1, and including a relatively flat triangular horn on the free end of said flexible hose, one of the flat sides of said horn including a transverse angularly formed projection adapted to engage the window glass of said automobile.

MAURICE S. COLE.

REFERENCES CITED

The following references are of record in the file of this patent:

UNITED STATES PATENTS

| Number | Name | Date |
| --- | --- | --- |
| 1,685,345 | Voss | Sept. 25, 1928 |
| 1,722,824 | Roethel | July 30, 1929 |
| 1,952,514 | Selby | Mar. 27, 1934 |
| 2,050,111 | McKelvey | Aug. 4, 1936 |
| 2,091,594 | Innes | Aug. 31, 1937 |
| 2,209,054 | Doud et al. | July 23, 1940 |
| 2,370,359 | McCart | Feb. 27, 1945 |
| 2,463,339 | Wetzel et al. | Mar. 1, 1949 |
| 2,469,986 | Phyfe | May 10, 1949 |
| 2,529,425 | Sharp | Nov. 7, 1950 |